United States Patent Office 3,704,226
Patented Nov. 28, 1972

3,704,226
PROCESS FOR THE PREPARATION OF PERMANENTLY MAGNETIZABLE MIXED OXIDES CONTAINING IRON
John W. Geus, Sittard, Netherlands, assignor to Stamicarbon N.V., Heerlen, Netherlands
No Drawing. Continuation of application Ser. No. 811,623, Mar. 28, 1969. This application Dec. 21, 1970, Ser. No. 100,450
Claims priority, application Netherlands, Mar. 30, 1968, 6804511
Int. Cl. C04b 35/26, 35/28, 35/32, 35/36
U.S. Cl. 252—62.56
1 Claim

ABSTRACT OF THE DISCLOSURE

A process for the preparation of permanently magnetizable iron containing mixed oxides by precipitation from an aqueous solution is disclosed. An aqueous solution of a ferrous salt containing also one or more salts of other metals, but no oxidizing agents, is intensively stirred, whereby a precipitate is gradually formed at elevated temperature by hydrolizing urea, likewise present in the solution, to ammonium carbamate, or ammonium carbonate, and the precipitate so formed is subsequently separated from the liquid, washed, dried and, if necessary, heat-treated in contact with air. Preferably the precipitation is carried out in an inert atmosphere. If the precipitate is used for the preparation of a permanently magnetizable mixed oxide to be used on tapes or sheets, the material is subjected to a thermal treatment below 500° C., and for the preparation of moulded objects, the compressed material is subjected to a thermal treatment at temperatures of 1000° C. or over.

---

This is a continuation of application Ser. No. 811,623 filed Mar. 28, 1969, now abandoned.

The present invention relates to the preparation of permanently magnetizable mixed oxides containing iron, by precipitation from an aqueous solution, which material can be used for the manufacture of permanently magnetic material, as highly magnetizable material for high-frequency applications, and for production of memory cells to be used in computers.

Most mixed oxides suited for the above-described purposes also contain one or more elements other than iron, such as nickel, cobalt, manganese, zinc, or the like. The composition to be used is entirely determined by the magnetic properties required for a given application. The process according to the invention is restricted to the preparation of a permanently magnetizable oxide or iron of this type containing one or more other elements.

Such mixed oxides are usually made from an oxide mixture with a suitable weight ratio, which mixture is treated in a ball mill for a prolonged period and is then heated at a high temperature for a considerable length of time; subsequently, after being subjected to a second grinding treatment, the mixture is moulded into a body of the desired shape and dimensions and sintered again at a higher temperature. The prolonged grinding treatment in the ball mill has the drawback that the oxide mixture gets contaminated with material (usually iron) from the ball mill. As, in consequence hereof, the composition of the resulting powders is not exactly defined, the magnetic qualities desired cannot be obtained. In addition, it is not possible to prevent sintering during the prolonged heat treatment required for making the solid-solid reaction proceed until a sufficiently homogeneous powder has formed. As a result, the sintering activity of the homogenized and moulded powder is low, which makes it difficult to obtain moulded bodies of sufficient density.

Occasionally, the said mixed oxides are made from a coprecipitate formed in an aqueous solution, which material is heated in the low-temperature range for a prolonged period of time to produce the iron modification suited for magnetic applications, after which the material is moulded and sintered at a high temperature. In the case of co-precipitates of the desired oxide combination, the corresponding hydroxides, carbonates or basic carbonates were usually precipitated by rapid addition of e.g., sodium carbonate. A drawback of this procedure is that the resulting powders are invariably contaminated with sodium; this substance can be removed only by treating the powders with water in an autoclave at 150° C. This is a laborious procedure, which is difficult to carry out on a large scale.

Another drawback of co-precipitation by the abovementioned customary method is that very small oxide particles are formed (100 A. units or smaller). Powders composed of such small particles cannot be compressed to 50% of the required density as determined by X-ray examination. If the material cannot be moulded to such a density, it will be impossible to sinter the material to a density substantially equal to 100%, of that required i.e. for obtaining a sufficient mechanical strength.

According to the invention, the iron can, in a simple way, be obtained in the form of a mixed oxide of the desired modification and the required particle size, if in an intensively stirred aqueous solution of a ferrous salt containing also one or more salts of other metals, but no oxidizing agents, a precipitate is gradually formed by hydrolyzing urea, likewise present in the solution, to ammonium carbamate, or ammonium carbonate, and the precipitate so formed is subsequently separated from the liquid, washed, dried and, if necessary, heat-treated in contact with air. The precipitation is preferably carried out in an inert atmosphere (nitrogen or argon).

To ensure gradual and homogeneous formation of the precipitate use is made of a chemical reaction known in itself. In this connection it is essential, however, that the process be started from a ferrous salt and the reaction take place in an inert atmosphere, so with exclusion of oxygen.

The salt solutions from which the other elements are precipitated by heating and prolonged and vigorous stirring need not be too highly diluted to effect a fine distribution of the precipitate. In general, use may very well be made of solutions containing 5–15% by weight of metal ions. The amount of urea present in the solution must be such that the pH-value at the end of the conversion equals 7 to 7.5 or over. As a rule, it will suffice to use 1 to 10 times the theoretical amount calculated with respect to the metal present in solution. The precipitate can quite readily be filtered, and upon drying of the residue a material of particularly good processibility is obtained.

The elements required for the preparation of the mixed oxide can generally be brought into solution in the form of a simple, readily obtainable salt, such as a chloride or a sulphate. Although nitrate gives rise to slight oxidation of the ferrous salt this is of minor importance, so that nitrate salts may also be employed. As is usual in homogeneous precipitation, large particles of about 5000 A. are obtained.

The dried material can be processed in two ways:
(a) If, with a view to the magnetic properties required, the particles must be isolated in a non-permanently magnetizable matrix, such as tapes or sheets, the material will, upon drying, be subjected to a heat-treatment at a temperature below 500° C. At this temperature, the material does not yet show much tendency to sinter and, consequently, remains particularly suited for being incorporated, e.g., in a polymerizable monomer.

(b) If permanently magnetizable material of high density and great homogeneity is required, e.g., for production of memory cells in computers, or for high-frequency applications, the material will, upon partial drying, be moulded into the required shape. A relatively short treatment at temperatures of 1000° C. or over will yield a material of substantially zero porosity and excellent homogeneity. The presence of some water in the first stage of the sintering process will in many cases greatly accelerate the said process.

The invention will be elucidated by means of the following three examples. The first example shows that a very suited material is obtained with ferrous chloride and nickel chloride. In the second example it is demonstrated that the use of a ferric salt, which, at very low pH-values, e.g. 2, precipitates in the form of a hydrated iron oxide, does not yield satisfactory results. The last example proves that nickel nitrate may also be employed.

EXAMPLE I 3.5 g. of $NiCl_2 \cdot 6H_2O$ and 7.55 g. of urea were dissolved in 800 ml. and 3 l. of desilicified water, respectively. The two solutions were boiled in a nitrogen atmosphere to drive out dissolved oxygen; after that, the pH of the urea solution was brought at 5.0, with concentrated hydrochloric acid. The solutions were brought together under nitrogen, after which 20 ml. of a ferrous chloride solution, free of ferric ions and containing 0.95 g. of iron in the ferrous form, were added. The solution was then heated at 100° C. in a nitrogen atmosphere and with vigorous stirring. After 24 h. all the dissolved metal ions had precipitated; the precipitate settled rapidly.

Upon filtration is contact with air, which went very smoothly, and subsequent washing, the precipitate was dried at 70° C. for 72 hours. It then contained 29.5% of Fe, 25.7% of Ni, 23% of $CO_2$ and 1.9% of Cl. In addition to a sharply defined X-ray diffraction pattern characteristic of $NiFe_2O_4$, a non-identifiable pattern with slightly broadened reflections was observed. Upon heating at 200° C. the preparation only showed a sharply defined diffraction pattern characteristic of $NiFe_2O_4$, while, upon heating at 300° C. for 20 h., a diffraction pattern of nickel oxide particles with a size of approximately 50 A. was visible besides the $NiFe_2O_4$ pattern (as was to be expected in view of the excess of nickel). Examination in the electron microscope showed that the particles do not change in size upon heating. The particles measured 5000 A. or over; the small nickel particles which, judged by the diffraction pattern are present upon heating at 300° C., probably occur on the much larger nickel-ferrite particles.

In all cases, so also upon drying at 70° C., the preparation was highly ferromagnetic.

EXAMPLE II 6.6 g. of $Ni(NO_3)_2 \cdot 6H_2O$ and 2.8 g. of urea were dissolved in 3 l. of desilicified water. In this solution 2.0 g. of $Fe_2O_3 \cdot H_2O$ (particle size 100–200 A. were suspended. Upon heating at 100° C. for 72 hours, the nickel had completely precipitated.

The precipitate was heterogeneous; the greenish white nickel hydroxide, or nickel carbonate, could be clearly distinguished from the brown iron oxide.

After drying at 100° C. for 20 hours the preparation contained: 27.3% of Fe, 29.1% of Ni, 0.2% of $NH_3$, 0.6% of $NO_3$ and 2.2% of $CO_2$.

The X-ray diffraction pattern suggested the presence of mainly $\alpha$-$Fe_2O_3 \cdot H_2O$ and also of $\delta$-FeOOH and 4 $Ni(OH)_2 \cdot NiOOH$. The preparation showed hardly any ferromagnetism. After heating at 200° C., it consisted mainly of $\epsilon$-FeOOH and, in addition of the two other components mentioned above; after heating at 300° C., $\delta$-FeOOH and $\alpha$-$Fe_2O_3$ were found. The preparation was slightly ferromagnetic. It appears from this that if hydrated ferric oxide is employed, no sufficient mixing with the second metal-oxide component is obtained.

EXAMPLE III 4.47 g. of $Ni(NO_3)_2 \cdot 6H_2O$ and 7.53 g. of urea were dissolved in 800 ml. and 3 l. of disilicified water respectively. The two solutions were boiled in a nitrogen atmosphere to drive out the oxygen. The degree of acidity of the urea solution was brought at appr. 5 by means concentrated nitric acid. After the two solutions had been brought together in a nitrogen atmosphere, 20 ml. of a ferrous chloride solution containing 0.95 g. of iron in the ferrous form were added. The solution was then heated at 100° C. in a nitrogen atmosphere and with continuous stirring. After 24 h., heating was stopped; the precipitate settled slowly.

Upon filtration in contact with air and subsequent washing, the precipitate was dried at 100° C. for 20 h. It then contained 28.2% of Fe, 26.4% of Ni, 0.02% of $NH_3$, 0.2% of $NO_3$, 3.7% of $CO_2$ and 0.1% of Cl. Besides the non-identifiable diffraction pattern found in the run described in Example 2, this preparation showed the $NiFe_2O_4$ pattern. Upon heating at 200° C. for 20 h., only the $NiFe_2O_4$ pattern was visible, while upon heating at 300° C. for 20 h., also a broadened nickel-oxide pattern could be observed.

In all cases, this preparation was highly ferromagnetic. The above examples relate to nickel-iron ferrite. Other ferrites containing cobalt, manganese, zinc, magnesium, aluminium, titanium or other metals, can be prepared in a completely analogous manner.

I claim:

1. A process for the preparation of permanently magnetizable mixed metal ferrites of iron and at least one other ferrite forming metal, by homogeneous precipitation from an aqueous solution wherein, in the absence of oxidizing agents and under an inert atmosphere, an intensively stirred aqueous solution containing (a) a soluble ferrous metal salt compound, (b) a soluble salt compound of said at least one other ferrite forming metal, and (c) urea is heated to hydrolyze said urea thereby causing the gradual precipitation of particles of a size larger than 100 A. of carbonates of iron and said at least one other ferrite forming metal, subsequently separating, washing and drying the precipitate so formed, subjecting the dried particles to a thermal treatment at a temperature below 500° C. thereby forming a homogeneous mixed metal ferrite powder by solid state reaction from said metal carbonates.

References Cited

UNITED STATES PATENTS 3,117,933  1/1964  Abeck et al. _____ 252—62.56
3,484,376  12/1969  Paris et al. _____ 252—62.56

FOREIGN PATENTS 676,885  12/1963  Canada _____ 252—62.56
752,659  7/1956  Great Britain _____ 252—62.56

OTHER REFERENCES

Vogel "Quant. Inorg. Analys." 3rd ed., Wiley & Sons, 1961, p. 113.

TOBIAS E. LEVOW, Primary Examiner

J. COOPER, Assistant Examiner

U.S. Cl. X.R.

252—62.58, 62.59, 62.62, 62.64